(No Model.)

G. W. & F. P. MURPHEY.
REEL FOR CHECK ROW WIRE.

No. 352,880. Patented Nov. 16, 1886.

WITNESSES
E. Hampton
J. N. Bills

INVENTORS
G. W. Murphey.
F. P. Murphey.
By L. P. Graham
Atty.

UNITED STATES PATENT OFFICE.

GEORGE W. MURPHEY AND FRANK P. MURPHEY, OF DECATUR, ILLINOIS.

REEL FOR CHECK-ROW WIRE.

SPECIFICATION forming part of Letters Patent No. 352,880, dated November 16, 1886.

Application filed February 5, 1886. Serial No. 190,896. (No model.)

*To all whom it may concern:*

Be it known that we, GEORGE W. MURPHEY and FRANK P. MURPHEY, residents of the city of Decatur, county of Macon, and State of Illinois, have invented certain new and useful Improvements in Reels for Check-Row Wires, of which the following is a specification.

Our invention relates to that class of check-row-wire reels adapted to be supported on a planter and rotated by power from a planter-wheel.

The object of our invention is to wind wire evenly on the reel, to brace the reel securely in a manner to compensate for vacillating motion in the planter, and to improve the operation of the friction-clamp used to regulate the rotative force of the reel.

Figure 1:
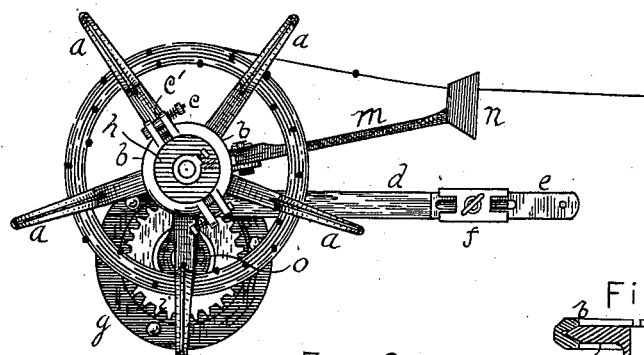
Figure 2:
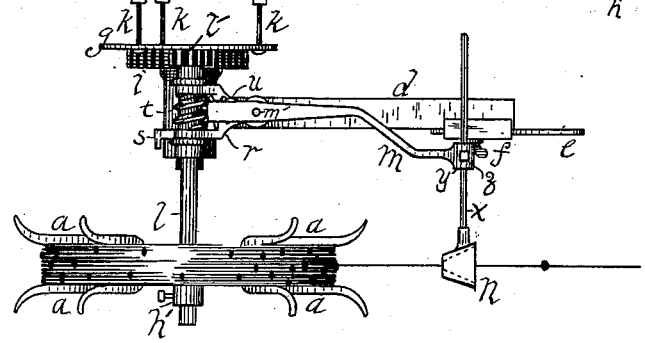
Figure 3:
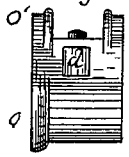
Figure 4:
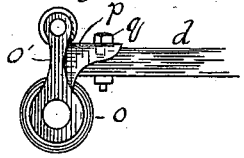
Figure 5:
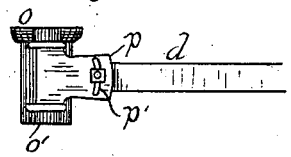
Figure 6:
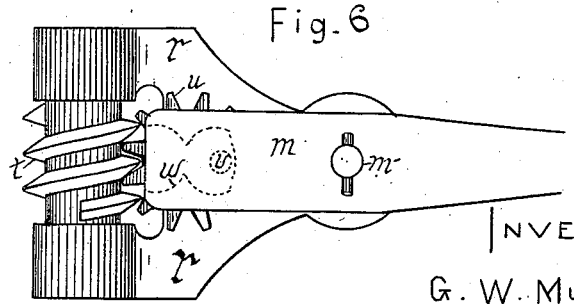

In the drawings accompanying and forming a part of this specification, Figure 1 is a side view of our device. Fig. 2 is a plan of the same. Figs. 3, 4, and 5 are end, side, and top views, respectively, of the reel-supporting bracket. Fig. 6 is a plan of mechanism used to operate the wire-guide, and Fig. 7 is a sectional view of the friction-regulating device.

$a$ is a check-row-wire reel. $b$ is a friction-clamp. $c$ are regulating-bolts for the friction-clamp. $c'$ is a projection on the reel to which the friction-clamp is secured. $d$ is a brace for the reel-bracket. $e$ is an extension-bar on brace $d$. $f$ is a guide-frame for bar $e$. $g$ is a plate to be bolted to the wheel of a planter over the hub. $h$ is a friction-pulley on the reel-shaft. $h'$ is a bolt that secures the friction-pulley to the shaft. $i$ is a gear-wheel on plate $g$. $k$ are bolts that are used to secure plate $g$ to the spokes of a planter-wheel. $l$ is the reel-shaft. $l'$ is a pinion on the reel-shaft in mesh with wheel $i$. $m$ is an oscillating arm pivoted at $m'$. $n$ is a wire-guide connected with oscillating arm $m$. $o$ is a tubular bearing that fits over a spindle on plate $g$. $o'$ is a bracket integral with bearing $o$, in which the reel-shaft is supported. $p$ is a shoulder on bracket $o'$. $q$ is a bolt that secures the brace $d$ to the shoulder $p$. $p'$ (see Fig. 5) is an arc-formed slot in shoulder $p$, through which bolt $q$ passes. $r$ is a frame pivoted on shaft $l$. $s$ is a projection on frame $r$, that strikes against the bracket and limits the upward throw of arm $m$. $t$ is a worm on shaft $l$ in frame $r$. $u$ is a worm-wheel on frame $r$ in mesh with worm $t$. $v$ is a pin on wheel $u$. (See dotted lines in Fig. 6.) $w$ indicates the contour of a slot in the under side of arm $m$, in which pin $v$ operates. $x$ is a rod that connects the wire-guide $n$ with arm $m$. $y$ is a head on arm $m$, in which rod $x$ slides, and $z$ is a bolt for securing said rod in position in said head.

The reel $a$ is mounted loosely on shaft $l$. The friction-clamp $b$ is secured to the reel by means of a bolt passing through projection $c'$. The bolts $c$ furnish means whereby the pressure of the friction-clamp may be regulated, and the friction-pulley $h$, while longitudinally movable on its shaft, is rigidly connected with said shaft when in operation.

Figure 7:
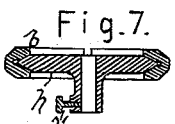

As shown in Fig. 7, the pulley $h$ is V-shaped at its periphery, and the clamp has a corresponding conformation. The clamp is secured to the reel, as before stated, the friction-pulley is laterally connected with the clamp by means of its peripheral conformation, and the position of the pulley on the shaft is secured by bolt $h'$.

Plate $g$ is provided with a spindle that fits over the hub of the planter-wheel, bearing $o$ fits on the spindle of the plate, and the reel-carrying shaft $l$ rotates in bracket $o'$, receiving motion from gear-wheel $i$ through pinion $l'$.

The brace $d$ extends from the bracket at an approximate right angle, and is vertically immovable with relation thereto. The slot $p'$ in plate $p$ gives the brace a limited amount of radial movement in a horizontal plane, and this adjustment facilitates the attachment of the brace to the front part of the planter. The attachment of the brace is effected through bar $e$, and the free longitudinal motion of said bar on brace $d$ compensates for vacillating motion in the front of the planter, while the peculiar relation of the brace to the bracket enables said bracket to be always maintained in an approximately vertical position.

To prevent the pin $v$ from holding the arm $m$ longer at its extreme positions than at any intermediate point, and causing the wire to accumulate faster at the sides than in the center of the reel, the slot $w$ is narrowed at its longitudinal center, substantially as shown. The reel $a$ is placed in such a position with relation to the check-rower that the wire will tend to wind always on the center of the reel, and consequently the oscillating arm is only needed to guide the wire to the sides of the reel. The speed of the rotation of pin $v$ is regular; but on account of the direction of its motion with reference to the arm its natural tendency is to carry said arm fastest when on a line with the longitudinal axis thereof. While passing through the enlarged ends of slot $w$ the pin $v$ is practically inoperative, and consequently the wire conforms to its natural tendency and winds on the central portion of the reel. When the pin strikes the narrowed portion of the slot, the arm is moved to one side and the wire guided to the side of the reel. As the rotation of the worm-wheel continues the pin throws the arm from side to side, with an interval between each stroke, during which the arm is entirely free, and the movements of said arm, as compared with the stationary or free intervals, should be so proportioned by the formation of the slot in the arm that the wire will be wound evenly on the reel. The inclination of the threads on the worm should be in such relation to the reel-gearing that the arm will have a speed of motion corresponding to the rotation of the reel, and it is thought the inclination as well as the general proportion of the parts shown in the drawings will be substantially correct.

The arm $m$ pivots vertically to conform to the varying amount of the wire on the reel, and both the reel and the guide may be shifted laterally to conform to different kinds of check-rowers.

As heretofore constructed, reels of the class specified have been braced with inextensible bars having pivotal connections to permit the natural vacillating motion of the front of the planter. This manner of bracing, while to a certain degree effective, does not hold the reel uniformly vertical while in operation; nor is it under all circumstances secure, for the reason that it may be possible in raising the front of the planter to so change the angle formed by the brace and reel bracket that said brace may be rendered inoperative and the reel be permitted to swing to the ground. In our device the vacillating motion of the planter is compensated for by the extensibility of the brace, and as the angle formed by the brace and bracket is permanent, no shifting of the planter-front can render said brace ineffective.

The friction-pulley is cast as nearly circular as may be, and the clamp formed in two sections elastically connected, in order to compensate for irregularities in the surface of the pulley. If the clamp were formed of an encircling band, with its ends elastically connected, an irregularity in the peripheral surface of the friction-pulley would bear unevenly on different parts of the clamp, producing the greatest amount of friction when farthest from the connecting ends of the clamp, and vice versa, the leverage being greatest farthest from the elastic connection; but when there are two elastic connections, as shown, an inequality of surface will approach one as it recedes from the other, and so keep the frictional pressure uniform.

It will be seen that the reel cannot be relied on to wind the wire precisely as fast as the planter travels, as if the various movements were accurately timed to produce that result the varying size of the diameter of the reel caused by the accumulation of wire would effect a consequent variation in the winding, which would become too fast for the motion of the planter. In view of this fact a frictional connection of some kind becomes a necessity, and of course the better the construction and arrangement of the frictional connection the better the general result.

We claim as new and desire to secure by Letters Patent—

1. In reels for check-row wire, a reel-shaft, a worm on the reel-shaft, a worm-wheel in mesh with the worm, an eccentric-pin on a face of the worm-wheel, and a wire-guide having a slot to receive the pin on the worm-wheel.

2. In reels for check-row wire, a reel-shaft, a worm on the reel-shaft, a worm-wheel in mesh with the worm, an eccentric-pin on a face of the worm-wheel, and a wire-guide having a centrally-contracted oblong slot to receive the pin on the worm-wheel.

3. A reel-shaft, a reel capable of adjustment longitudinally on the reel-shaft, a worm, a co-operating worm-wheel having an eccentric-pin, a pivoted arm adapted to be oscillated by the eccentric-pin, and a laterally-adjustable wire-guide in connection with said arm.

4. A bracket for a check-row-wire reel, adapted to fit over a planter-wheel hub in an approximately vertical position, and a brace forming a permanent approximate right angle therewith, as and for the purpose set forth.

5. A bracket for a check-row-wire reel, adapted to fit over a planter-wheel hub in an approximately vertical position, and a longitudinally-extensible brace forming a permanent approximate right angle therewith, as and for the purpose set forth.

6. A bracket for the shaft of a check-row-wire reel, adapted to fit over a planter-wheel hub in an approximately vertical position, and a horizontally-adjustable brace vertically immovable in said bracket and forming an approximate right angle therewith.

7. A reel loosely mounted on its shaft, a pulley partaking of the rotary motion of the shaft, and a clamp attached to the reel and encircling the pulley, the said clamp being composed of two or more elastically-connected sections.

GEO. W. MURPHEY.
FRANK P. MURPHEY.

Attest:
C. C. CLARK,
L. P. GRAHAM.